(12) United States Patent
Yu (10) Patent No.: US 8,335,686 B2
(45) Date of Patent: Dec. 18, 2012

(54) METHOD AND APPARATUS OF AUDIO SWITCHING

(75) Inventor: Shuian Yu, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 1179 days.

(21) Appl. No.: 11/579,500

(22) PCT Filed: Apr. 27, 2005

(86) PCT No.: PCT/CN2005/000580
§ 371 (c)(1),
(2), (4) Date: Nov. 3, 2006

(87) PCT Pub. No.: WO2005/112413
PCT Pub. Date: Nov. 24, 2005

(65) Prior Publication Data
US 2008/0040117 A1   Feb. 14, 2008

(30) Foreign Application Priority Data

May 14, 2004 (CN) .......................... 2004 1 0038195

(51) Int. Cl.
*G10L 21/02* (2006.01)
*H04L 12/16* (2006.01)
*H04B 1/00* (2006.01)
*H04B 7/14* (2006.01)
*H04M 3/32* (2006.01)

(52) U.S. Cl. ........ 704/228; 704/226; 370/260; 375/148; 379/202.01; 455/17

(58) Field of Classification Search .................... 348/14; 370/260–266, 147, 148, 447, 401; 379/202
See application file for complete search history.

(56) References Cited

U.S. PATENT DOCUMENTS
5,625,407 A * 4/1997 Biggs et al. ................ 348/14.11
(Continued)

FOREIGN PATENT DOCUMENTS
CN        1033340 A        6/1989
(Continued)

OTHER PUBLICATIONS

Peter Dommel and J.J. Garcia-Luna-Aceves. Efficacy of floor control protocols in distributed multimedia collaboration . Computer Engineering Department, Baskin School of Engineering, University of California. Jul. 1999. Cluster Computing, vol. 2, No. 1. pp. 17-33.*

(Continued)

*Primary Examiner* — Pierre-Louis Desir
*Assistant Examiner* — Matthew Baker
(74) *Attorney, Agent, or Firm* — Finnegan, Henderson, Farabow, Garrett & Dunner, LLP (57) ABSTRACT

A method for speech switching, including: extracting mute flags from encoded speech data transmitted by each of the terminals respectively in order to determine one or more non-mute terminals; decoding the encoded speech data of each non-mute terminal respectively; calculating speech energy of each non-mute terminal according to the decoded speech data of each non-mute terminal; comparing the speech energy of the non-mute terminals and selecting one or more terminals with relatively large speech energy; performing linear superposition with different combination methods to the decoded speech data of the selected terminals, and encoding the decoded speech data which is obtained from the linear superposition of the different combination methods, and transmitting the data to the corresponding terminals respectively. An apparatus for speech switching is also disclosed. With this invention, resource consumption during procedure of speech switching may be reduced, the effect of speech communication may be improved.

12 Claims, 7 Drawing Sheets

U.S. PATENT DOCUMENTS

| | | | | |
|---|---|---|---|---|
| 5,761,237 | A * | 6/1998 | Petersen et al. | 375/148 |
| 5,864,583 | A * | 1/1999 | Ozkan | 375/242 |
| 5,943,429 | A * | 8/1999 | Handel | 381/94.2 |
| 5,953,049 | A * | 9/1999 | Horn et al. | 348/14.09 |
| 6,006,108 | A * | 12/1999 | Black et al. | 455/553.1 |
| 6,125,343 | A | 9/2000 | Schuster | |
| 6,125,398 | A * | 9/2000 | Mirashrafi et al. | 709/236 |
| 6,148,206 | A * | 11/2000 | Karanja et al. | 455/436 |
| 6,148,422 | A * | 11/2000 | Strawczynski et al. | 714/704 |
| 6,175,634 | B1 * | 1/2001 | Graumann | 381/94.1 |
| 6,418,125 | B1 * | 7/2002 | Oran | 370/266 |
| 6,453,285 | B1 * | 9/2002 | Anderson et al. | 704/210 |
| 6,522,633 | B1 * | 2/2003 | Strawczynski | 370/260 |
| 6,522,899 | B1 * | 2/2003 | Yoon | 455/566 |
| 6,597,667 | B1 * | 7/2003 | Cerna | 370/260 |
| 6,662,155 | B2 * | 12/2003 | Rotola-Pukkila et al. | 704/228 |
| 6,694,294 | B1 * | 2/2004 | Garudadri | 704/234 |
| 6,708,147 | B2 * | 3/2004 | Mekuria et al. | 704/228 |
| 6,721,409 | B1 * | 4/2004 | Dell et al. | 379/202.01 |
| 6,728,222 | B1 * | 4/2004 | Ono | 370/260 |
| 6,810,273 | B1 * | 10/2004 | Mattila et al. | 455/570 |
| 6,839,416 | B1 * | 1/2005 | Shaffer | 379/202.01 |
| 6,847,618 | B2 * | 1/2005 | Laursen et al. | 370/261 |
| 6,870,919 | B2 * | 3/2005 | Dobler | 379/207.02 |
| 6,912,401 | B2 * | 6/2005 | Rosen et al. | 455/518 |
| 6,922,547 | B2 * | 7/2005 | O'Neill et al. | 455/17 |
| 6,940,826 | B1 * | 9/2005 | Simard et al. | 370/260 |
| 6,999,783 | B2 * | 2/2006 | Toyryla et al. | 455/519 |
| 7,058,026 | B1 * | 6/2006 | Hera et al. | 370/265 |
| 7,079,857 | B2 * | 7/2006 | Maggenti et al. | 370/447 |
| 7,158,558 | B2 * | 1/2007 | Petre et al. | 375/147 |
| 7,170,924 | B2 * | 1/2007 | Corbaton et al. | 375/148 |
| 7,187,767 | B2 * | 3/2007 | Ghomeshi et al. | 379/421 |
| 7,206,404 | B2 * | 4/2007 | Parry et al. | 379/406.01 |
| RE39,722 | E * | 7/2007 | Hansen et al. | 379/88.25 |
| 7,257,641 | B1 * | 8/2007 | VanBuskirk et al. | 709/238 |
| 7,260,231 | B1 * | 8/2007 | Wedge | 381/310 |
| 7,558,736 | B2 * | 7/2009 | Thalanany et al. | 704/275 |
| 7,570,752 | B2 * | 8/2009 | Jachner | 379/202.01 |
| 7,701,954 | B2 * | 4/2010 | Rabenko et al. | 370/401 |
| 7,706,477 | B2 * | 4/2010 | Larsson | 375/340 |
| 2001/0034601 | A1 * | 10/2001 | Chujo et al. | 704/233 |
| 2001/0053132 | A1 * | 12/2001 | Attimont et al. | 370/260 |
| 2005/0213725 | A1 * | 9/2005 | Rodman | 379/202.01 |
| 2005/0213726 | A1 * | 9/2005 | Rodman | 379/202.01 |
| 2005/0213731 | A1 * | 9/2005 | Rodman et al. | 379/202.01 |
| 2005/0213732 | A1 * | 9/2005 | Rodman | 379/202.01 |
| 2005/0213734 | A1 * | 9/2005 | Rodman | 379/202.01 |
| 2006/0126538 | A1 * | 6/2006 | Krstulich | 370/260 |

FOREIGN PATENT DOCUMENTS

| | | |
|---|---|---|
| CN | 1114811 A | 1/1996 |
| CN | 1237304 A | 12/1999 |
| CN | 1314762 A | 9/2001 |
| CN | 100466671 C | 11/2005 |
| EP | 1 324 582 A1 | 7/2003 |

OTHER PUBLICATIONS

Coding of Speech at 16 kbit/s using Low-delay Code Excited Linear Prediction, Recommendation G.728. CCITT Geneva, 1992.*
English Abstract of 1114811 A Published Jan. 10, 1996.
English Abstract of 1237304 A Published Dec. 1, 1999.
English Abstract of 1033340 A Published Jun. 7, 1989.
Written Opinion of the International Searching Authority (translation) dated (mailed) Aug. 18, 2005, issued in related Application No. PCT/CN2005/000580, filed Apr. 27, 2005, Huawei Technologies Co., Ltd.

* cited by examiner

METHOD AND APPARATUS OF AUDIO SWITCHING

FIELD OF THE INVENTION

The present invention relates to the field of multimedia communication technology in general, and more particularly, to a method and an apparatus for speech switching.

BACKGROUND OF THE INVENTION

During point-to-point speech communication, speech is typically interchanged between the terminals of both sides, so that each of the terminals may hear the voice from the terminal of the other side. While in multi-point (i.e. more than 2 terminals simultaneously attending communication) communication, for example, in a conference telephone system or a video conference system, instead of the simple point-to-point speech switching as implemented in the above-mentioned point-to-point speech communication, an assistant network-side device, i.e. a speech-switching device, is needed to perform speech switching between multiple terminals so that speech can be exchanged freely between all the terminals, since there is a possibility that multiple terminals participate in a same communication simultaneously. Wherein, the speech switching between multiple terminals is generally based on the following principles:

1) Each terminal can hear the voice from the other terminals, and speech exchange can be implemented conveniently and freely;

2) The present terminal should not hear its own voice;

3) To obviate speech distortion, each terminal is generally permitted to hear only the voice of several terminals with relatively loud voice over the other terminals.

Figure 1:
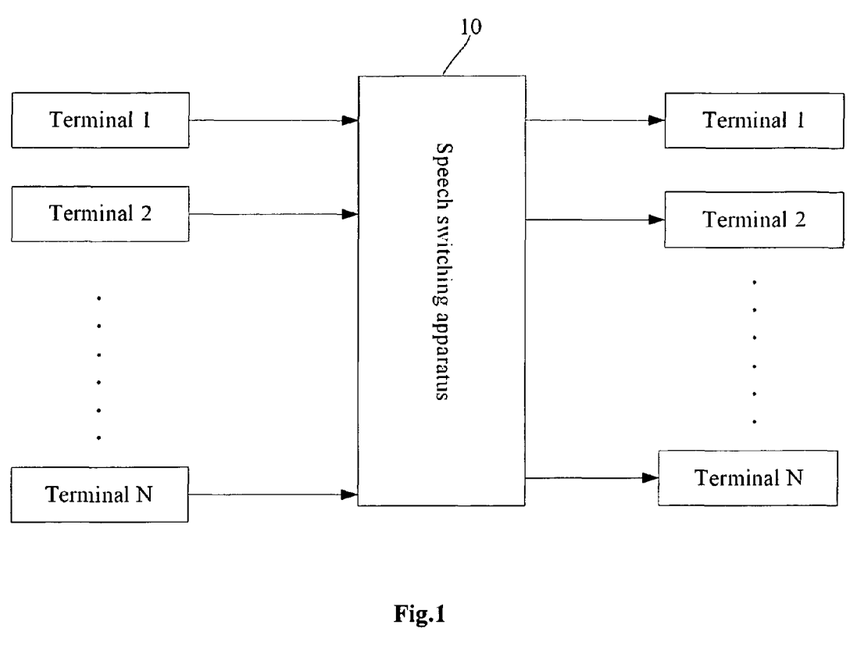
FIG. 1. is a diagram illustrating the whole process of speech switching between multiple terminals according to the prior art.

In general, since speech switching between multiple terminals is realized on the network side, use is made of the method of centralized processing by the speech-switching device. The speech-switching device receives the encoded speech data from each terminal, and outputs the speech-mixed encoded speech data after speech-mixing. Refer to FIG. 1, which is a diagram illustrating the whole procedure of speech switching between multiple terminals according to the prior art. In which, the terminal 1, terminal 2 . . . and terminal N input their own encoded speech data into a speech-switching device 10 provided at the network side respectively. The speech-switching device 10 will decode the encoded speech data from each terminal respectively and select the decoded speech data with relatively large speech energy (i.e. the above-mentioned voice of the several terminals with relatively loud voice), and perform different encoding process to the selected data, and then transmit the data to different terminals. For example, suppose that after the data is decoded and the speech energy of the data is calculated, the speech-switching device 10 shown in the figure selects terminal 1 and terminal 2 as the current terminals with relatively loud voice. According to the above-mentioned speech-switching principles, the speech-switching device 10 will transmit the data to the terminal 1 after the decoded speech data of the terminal 2 is encoded, enabling the terminal 1 to hear only the voice of the terminal 2. After the decoded speech data of the terminal 1 is encoded, the speech-switching device 10 will transmit the data to the terminal 2, enabling the terminal 2 to hear only the voice of the terminal 1. In addition, the speech-switching device 10 will also perform speech-mixing synthesis to the decoded speech data of terminal 1 and terminal 2, and perform the corresponding synthesis encoding process, then transmit the speech-mixed encoded speech data to the terminal 3, . . . , terminal N respectively, enabling the terminal 3, . . . , terminal N to hear the voice of terminal 1 and terminal 2 at the same time. Therefore, with the above-mentioned speech-switching process, multiple terminals may exchange voice freely with each other in the case that the terminals participate in a communication at the same time, thus achieving the multi-point speech communication.

At present, both the conference telephone system and video conference system are communication systems supporting multi-point speech communication. In these systems supporting multi-point speech communication, the specific method for speech switching between multiple terminals by the speech-switching device on the network side includes the steps:

(1) the encoded speech data of each terminal attending the same conference is fully decoded in real time, and the speech energy of each terminal is calculated in real time according to the decoded speech data of each terminal; wherein the general formula for calculating the speech energy of each terminal is:

$$E(t) = \sum_{n=t_1}^{t_2} S^2(n) \text{ or } E(t) = \sum_{n=t_1}^{t_2} |S(n)|,$$

in which $S(n)$ is the decoded speech data of each terminal; $t_1$ and $t_2$ are the starting time and ending time for calculating the speech energy respectively.

(2) the speech energy of the individual terminals attending the same conference is compared in real time according to the above-mentioned calculated speech energy of each terminal.

(3) several terminals with relatively large speech energy are selected as maximal-voice terminals in real time according to the above-mentioned comparison result of speech energy (the number of selected maximal-voice terminals is predefined by a relevant operator). The other unselected terminals receive the linearly superposed speech data of the decoded speech data of the several maximal-voice terminals, while each selected terminal receives the decoded linearly superposed speech data of the other maximal-voice terminals except itself, respectively, thereby the speech switching between multiple terminals may be implemented.

Figure 2:
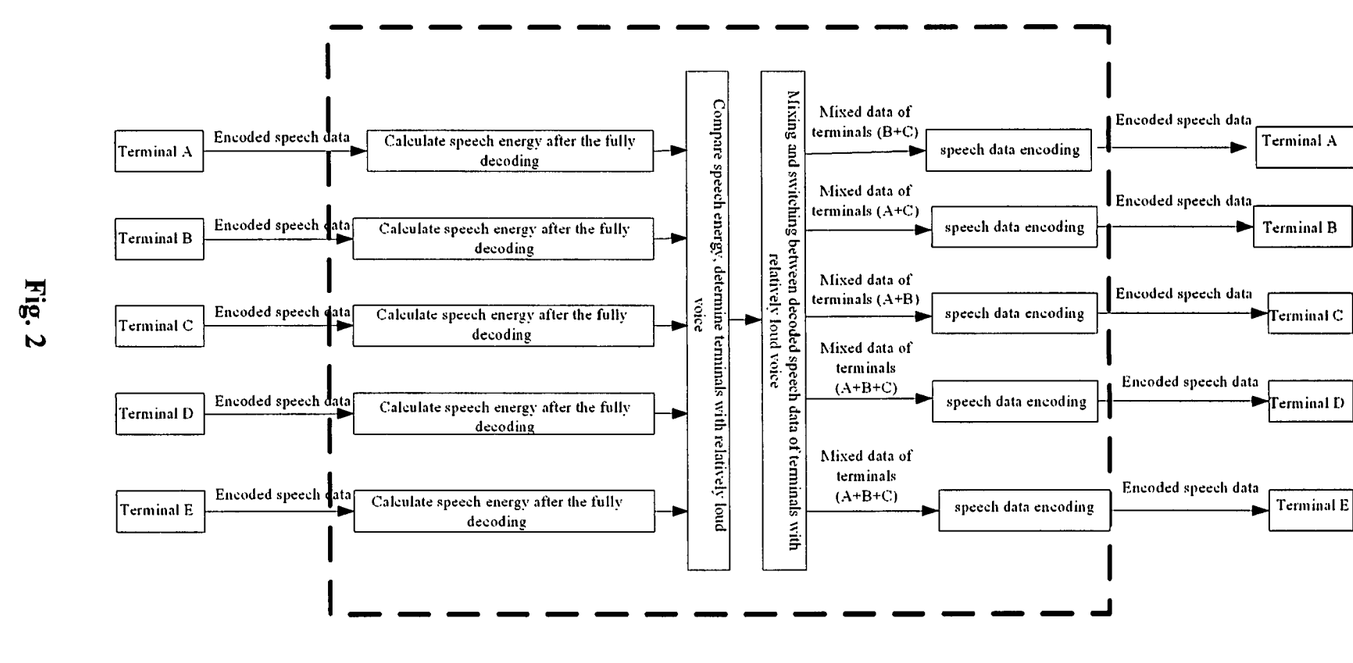
FIG. 2. is a schematic diagram illustrating the process of speech-switching processing between five terminals attending a conference according to the prior art.

The whole processing procedure of speech switching between multiple terminals will be illustrated below. Now refer to FIG. 2, which is a schematic diagram illustrating the processing procedure for speech switching between the five terminals attending a conference according to the prior art. The terminal A, terminal B, terminal C, terminal D and terminal E in the figure are five terminals that perform speech communication with each other, wherein at time t, the main process of speech switching between the five terminals implemented by the speech-switching device on the network side includes the following steps:

1) First, the encoded speech data transmitted from each of the terminal A, terminal B, terminal C, terminal D and terminal E respectively is fully decoded, and the speech energy of each terminal is calculated respectively according to the decoded speech data, so as to obtain the speech energy value of each terminal.

2) The calculated speech energy values of the five terminals are compared with each other and the terminals with relatively large speech energy are selected. For example, at time t, suppose that the terminal A, terminal B and terminal C are determined to be the terminals with relatively large speech energy according to the calculated speech energy values, then the terminal A, terminal B and terminal C will be selected as the terminals with relatively large speech energy.

3) A speech mixing and switching is performed to the decoded speech data sent from terminal A, terminal B and terminal C according to the specific conditions for transmitting to different terminals:

For example, at time t, for the terminal A, terminal B and terminal C which have relatively large speech energy, the terminal A receives the linearly superposed speech data of the decoded speech data of the terminal B and terminal C; wherein the formula for linear superposition may be:

$$S_A = \lambda_B \times S_B + \lambda_C \times S_C;$$

in which $\lambda_B$ and $\lambda_C$ are weighting factors, and $\lambda_B + \lambda_C = 1$;

$S_A$ is the linearly superposed speech data received by terminal A, $S_B$ is the decoded speech data of terminal B and $S_C$ is the decoded speech data of terminal C;

The terminal B receives the linearly superposed speech data of the decoded speech data of the terminal A and terminal C, in which the calculation method of linear superposition is similar to that of the terminal A mentioned above.

The terminal C receives the linearly superposed speech data of the decoded speech data of the terminal A and terminal B, in which the calculation method of linear superposition is similar to that of the terminal A described above.

The other terminals, i.e. the terminal D and terminal E, receive the linearly superposed speech data of the decoded speech data of the terminal A, terminal B and terminal C; wherein the formula for linear superposition is:

$$S = \lambda_A \times S_A + \lambda_B \times S_B + \lambda_C \times S_C;$$

in which $\lambda_A$, $\lambda_B$ and $\lambda_C$ are weighting factors, and $\lambda_A + \lambda_B + \lambda_C = 1$;

$S_A$ is the decoded speech data of the terminal A, $S_B$ is the decoded speech data of the terminal B and $S_C$ is the decoded speech data of the terminal C, S is the linearly superposed speech data received by the terminal D and terminal E.

4) The linearly superposed speech data is encoded in order according to the above-mentioned different linearly superposed speech data, and then the encoded speech data is transmitted to the corresponding terminals. For example, the linearly superposed speech data of the terminal B and terminal C is encoded, and then transmitted to the terminal A, so that at time t, the terminal A can hear the voice of the terminal B and terminal C, but will not hear its own voice. The linearly superposed speech data of the terminal A, terminal B and terminal C is encoded, and transmitted to the terminal D and terminal E respectively, so that terminal D and terminal E can hear the voices of the terminal A, terminal B and terminal C at time t, thus the speech switching results are in conformity with the above-mentioned basic principles of speech switching.

However, it can be seen that:

(A) The speech switching device has to fully decode the encoded speech data received from each terminal before calculating the speech energy of each terminal, then the linear superposition of the decoded speech is performed, and at last, the linearly superposed speech data is encoded and sent to each terminal. Therefore, a fully encoding/decoding operation has to be performed respectively for the data of each terminal, which will result in the waste of resources. Especially for large-capacity communication system with more terminals that participate in a conference, the waste of resources is more serious, thus affecting the communication efficiency and communication performance.

(B) In the communication systems supporting multi-point speech communication, an operator may usually predefine a particular number of terminals with relatively large speech energy to be selected during switching process in the speech switching device (typically, three terminals with relatively large speech energy may be selected). During the following speech-switching process of multiple terminals, the corresponding number of terminals with relatively large speech energy will be selected to implement linear superposition of decoded speech data according to the predefined number. In this way, in the case that the number of terminals at a certain time is smaller than the predefined number of terminals to be selected, one or more noises will be introduced, which results in the deterioration of the speech communication between the multiple terminals. Referring to the example shown in FIG. 2, in the case that a manager predefines that three terminals are to be selected as terminals with relatively large speech energy for the linear superposition of decoded speech data, and if at a certain time t, only terminal A and terminal B have speech, it still needs to select three terminals as terminals with relatively large speech energy for speech switching according to the presetting, thus one of the terminals C, D, and E will be selected randomly besides the terminals A and B. This selected terminal is equivalent to the introduction of one noise, which will be linearly superposed with the decoded speech data of the terminal A and terminal B respectively and transmitted to the corresponding terminals. As a result, the voice heard by the terminal A is the superposition of the voice of terminal B and a noise; the voice heard by terminal B is the superposition of the voice of terminal A and a noise; and the voice heard by terminal D and terminal E are the superposition of the voice of terminal A, the voice of terminal B and a noise. In summary, it is equivalent that a noise is heard by all of the terminal A, terminal B, terminal D and terminal E, thus the speech communication quality between the multiple terminals is deteriorated.

SUMMARY OF THE INVENTION

The present invention provides a method and apparatus for speech switching.

A method for speech switching between multiple terminals, which includes:

(1) extracting mute flag from encoded speech data transmitted by each of the terminals respectively in order to determine one or more non-mute terminals;

(2) decoding the encoded speech data of each non-mute terminal respectively;

(3) calculating speech energy of each non-mute terminal according to the decoded speech data of each non-mute terminal;

(4) comparing the speech energy values of the non-mute terminals with each other and selecting one or more terminals with relatively large speech energy;

(5) performing linear superposition of different combination modes to the decoded speech data of the selected terminals, and encoding the decoded speech data which is obtained after the linear superposition of the different combination modes, and transmitting the data to the corresponding terminals respectively.

Wherein the decoding operation in step (2) may be a fully decoding operation.

Wherein, the decoding operation said in step (2) may be non-fully decoding operation; and between step (4) and step (5), the method further includes a step of fully decoding the encoded speech data transmitted by each selected terminal.

Wherein between step (4) and step (5), the method may further include a step of extracting mute flags from the decoded speech data of each of the selected terminals respectively and filtering off the mute terminals from the selected terminals.

When the terminals adopt the speech coding/decoding protocol G.728, the fully decoding operation may includes the steps of:

extracting corresponding code vectors from excitation codebooks according to codebook indexes contained in the encoded speech data transmitted by the terminals;

performing a logarithmic gain prediction and decoding synthesis filtering process to the extracted code vectors in order to obtain the corresponding decoded vectors;

postfiltering the obtained decoded vectors in order to obtain the corresponding fully decoded speech data.

Wherein, the order of the logarithmic gain prediction is set to 10; and the order of the decoding synthesis filtering process is set to 50.

Wherein, when the terminals adopt the speech coding/decoding protocol G.728, the non-fully decoding operation includes:

extracting corresponding code vectors from excitation codebooks according to codebook indexes contained in the encoded speech data transmitted by the terminals;

postfiltering the obtained decoded vectors to obtain the corresponding non-fully decoded speech data.

Wherein, the order of the logarithmic gain prediction is set to 4; the order of the decoding synthesis filtering process is set to 8.

Wherein, the method may further include a step of pre-determining the number of the terminals with relatively large speech energy to be selected before step (1);

in the case that the number of the obtained non-mute terminals determined based on the mute flags extracted in step (1) is relatively large than or equal to the pre-determined number, the pre-determined number of terminals with relatively large speech energy may be selected in step (4);

in the case that the number of the obtained non-mute terminals determined based on the mute flags extracted in step (1) is smaller than the pre-determined number, all the non-mute terminals may be selected as terminals with relatively large speech energy in step (4).

Wherein, in step (3), by using the decoded speech data of the non-mute terminals, the speech energy of each non-mute terminal may be calculated by the following formula:

$$E(t) = \sum_{n=t_1}^{t_2} S^2(n)$$

in which, E(t) represents the speech energy of a non-mute terminal at time t, and S(n) is encoded speech data of the non-mute terminal at each moment n; $t_1$ and $t_2$ respectively represents the starting time and ending time for calculating the speech energy of the non-mute terminal.

Wherein, in step (3), according to the decoded speech data of the non-mute terminals, the speech energy of each non-mute terminal is calculated by the following formula:

$$E(t) = \sum_{n=t_1}^{t_2} |S(n)|$$

in which, E(t) represents the speech energy of a non-mute terminal at time t, and S(n) is encoded speech data of the non-mute terminal at each moment n; $t_1$ and $t_2$ respectively represents the starting time and ending time for calculating the speech energy of the non-mute terminal.

Wherein step (5) may further include:

(51) for the selected terminals, isolating the decoded speech data of one selected terminal at a time in order, performing a linear superposition process to the decoded speech data of other selected terminals, encoding the superposed speech data and transmitting the data to the isolated terminal;

(52) performing a uniform linear superposition process to the decoded speech data of all the selected terminals, encoding the superposed speech data and transmitting the data to the unselected terminals.

Wherein step (52) may further include:

for the terminals adopting a same speech encoding/decoding protocol among the unselected terminals, encoding the superposed speech data according to the protocol and transmitting the data to these unselected terminals adopting the same speech encoding/decoding protocol.

Wherein, the linear superposition of the decoded speech data of the selected terminals is implemented by the following formula:

$$S = \lambda_1 \times S_1 + \lambda_2 \times S_2 + \ldots + \lambda_n \times S_n$$

in which, $\lambda_1, \lambda_2 \ldots \lambda_n$ are weighting factors, and $\lambda_1 + \lambda_2 + \ldots + \lambda_n = 1$; S is the decoded speech data after linear superposition to be received by the terminals, $S_1$ is the decoded speech data of the first terminal, $S_2$ is the decoded speech data of the second terminal, ... and $S_n$ is the decoded speech data of the nth terminal.

Accordingly, an apparatus for speech switching between multiple terminals may include:

a first mute flag extracting unit, which is adapted to extract the mute flags from the encoded speech data transmitted by each terminal respectively;

a first decoding unit, which is connected with the first mute flag extracting unit, and is adapted to decode the encoded speech data of the non-mute terminals after the mute flags are extracted;

a speech energy calculating unit, which is connected with the first decoding unit, and is adapted to calculate the speech energy of each non-mute terminal according to the decoded speech data of each non-mute terminal;

a speech energy comparing unit, which is connected with the speech energy calculating unit, and is adapted to compare the speech energy values of the non-mute terminals with each other and select the terminals with relatively large speech energy;

a linear superposition unit, which is connected with the speech energy comparing unit, and is adapted to perform a linear superposition in different combination methods to the decoded speech data of the selected terminals;

an encoding unit, which is connected with the linear superposition unit, and is adapted to encode the decoded speech data after linear superposition and transmit the data to the corresponding terminals.

Wherein, the first decoding unit fully decodes the encoded speech data transmitted by the terminals, and when the terminals adopt the speech encoding/decoding protocol G.728, the first decoding unit may further include:

an excitation codebook searcher, which is adapted to extract the corresponding code vectors from excitation codebook according to the codebook indexes contained in the encoded speech data transmitted by the terminals;

a logarithmic gain predictor, which is adapted to perform a logarithmic gain prediction to the extracted code vectors;

a decoding synthesis filter, which is adapted to perform a decoding synthesis filtering process to the code vectors after the logarithmic gain prediction in order to obtain the corresponding decoded vectors;

a postfilter, which is adapted to postfilter the obtained decoded vectors, and obtain the corresponding fully decoded speech data.

Wherein, the order of the logarithmic gain prediction may be set to 10; the order of the decoding synthesis filtering may be set to 50.

Wherein, the first decoding unit non-fully decodes the encoded speech data transmitted by the terminals; and the apparatus further includes a second decoding unit, and the speech energy comparing unit is connected with the linear superposition unit through the second decoding unit; the second decoding unit is adapted to fully decode the encoded speech data transmitted by each selected terminal.

Wherein, the terminals adopt speech encoding/decoding protocol G.728, the first decoding unit may further include:

an excitation codebook searcher, which is adapted to extract the corresponding code vectors from excitation codebook according to the codebook indexes contained in the encoded speech data transmitted by the terminals;

a logarithmic gain predictor, which is adapted to perform a logarithmic gain prediction to the extracted code vectors;

a decoding synthesis filter, which is adapted to perform a decoding synthesis filtering process to the code vectors after the logarithmic gain prediction in order to obtain the corresponding non-fully decoded speech data.

Wherein, the order of the logarithmic gain prediction is set to 4; the order of the decoding synthesis filtering process is set to 8.

Wherein, the apparatus further includes a second mute flag extracting unit, and the speech energy comparing unit or the second decoding unit is connected with the linear superposition unit through the second mute flag extracting unit; the mute flag extracting unit is adapted to extract the mute flags from the decoded speech data of each selected terminal and filter the mute terminals from the selected terminals.

It can be seen from the above-described method and the apparatus for speech switching of the present invention that:

In the method and the apparatus for speech switching of the present invention, a mute flag extracting operation is performed to each terminal attending the conference, so that only the encoded data of the non-mute terminals is decoded, and the linear superposition and encoding process are performed only to the decoded speech data of the terminals with relatively large speech energy among the non-mute terminals. Therefore, the encoding/decoding times during the whole speech switching process will be greatly reduced, and the number of the terminals attending the conference can be increased while the same system resources are available, so that the consumption of system resources can be saved.

In the method and the apparatus for speech switching of the present invention, the encoded speech data of the terminals may be decoded with a non-fully decoding method, then the speech energy of each terminal may be calculated directly based on the non-fully decoded speech data, so that the amount of calculation of the system will be reduced compared with the prior art in which terminals with relatively large speech energy is selected and decoded with a fully decoding method, thereby the consumption of system resources can be reduced.

In the method and the apparatus for speech switching of the present invention, a mute flag extracting operation is performed, in order to prevent a mute terminal from being regarded as terminal with relatively large speech energy so that the decoded speech data of the mute terminal will not take part in the linear superposition process, otherwise the noise will be introduced and the effect of speech switching may be degraded. As a result, the effect of speech communication between multiple terminals can be improved.

With the non-fully decoding technique according to the method and the apparatus for speech switching of the present invention, the occupied system resources may be reduced while it may be ensured to calculate the speech energy of the terminals.

DETAILED DESCRIPTION OF THE PREFERRED EMBODIMENTS

In the prior art, the process of speech-switching in multipoint speech communication attended by multiple terminals is as follows: the encoded speech data of each terminal is fully decoded first, then the speech energy of each terminal is calculated based on the fully decoded speech data of each terminal; one or more terminals with relatively large speech energy are selected; and the fully decoded speech data of the selected terminals is mixed and switched; the speech data of each terminal is then encoded and transmitted to the corresponding terminal. With the method in the prior art, more system resource will be consumed, and it is more likely to introduce noises, thus deteriorating the effect of speech communication. In a method and apparatus for speech switching according to an embodiment of the present invention, a mute flag is extracted first for the encoded speech data transmitted from each terminal, and only the data from the non-mute terminals will be decoded and only the energy of these non-mute terminals will be calculated, in which the fully decoding operation or non-fully decoding operation may be selected according to the various speech encoding/decoding protocols adopted by the terminals. Next, the terminals with relatively large speech energy are selected according to the speech energy of the non-mute terminals. Then the speech-mixing may be performed. As a result, heavy consumption of system resources may be avoided and the effect of speech communication may be improved.

For the terminals that do not participate in speech mixing, the encoding times can be determined according to the number of types of speech encoding/decoding protocols adopted by the terminals, since the linear superposition speech data received by these terminals are same. For the terminals that participate in speech mixing, the linearly superposed speech data received by the terminals needs to be encoded in order, since the data are different from each other.

Figure 3:
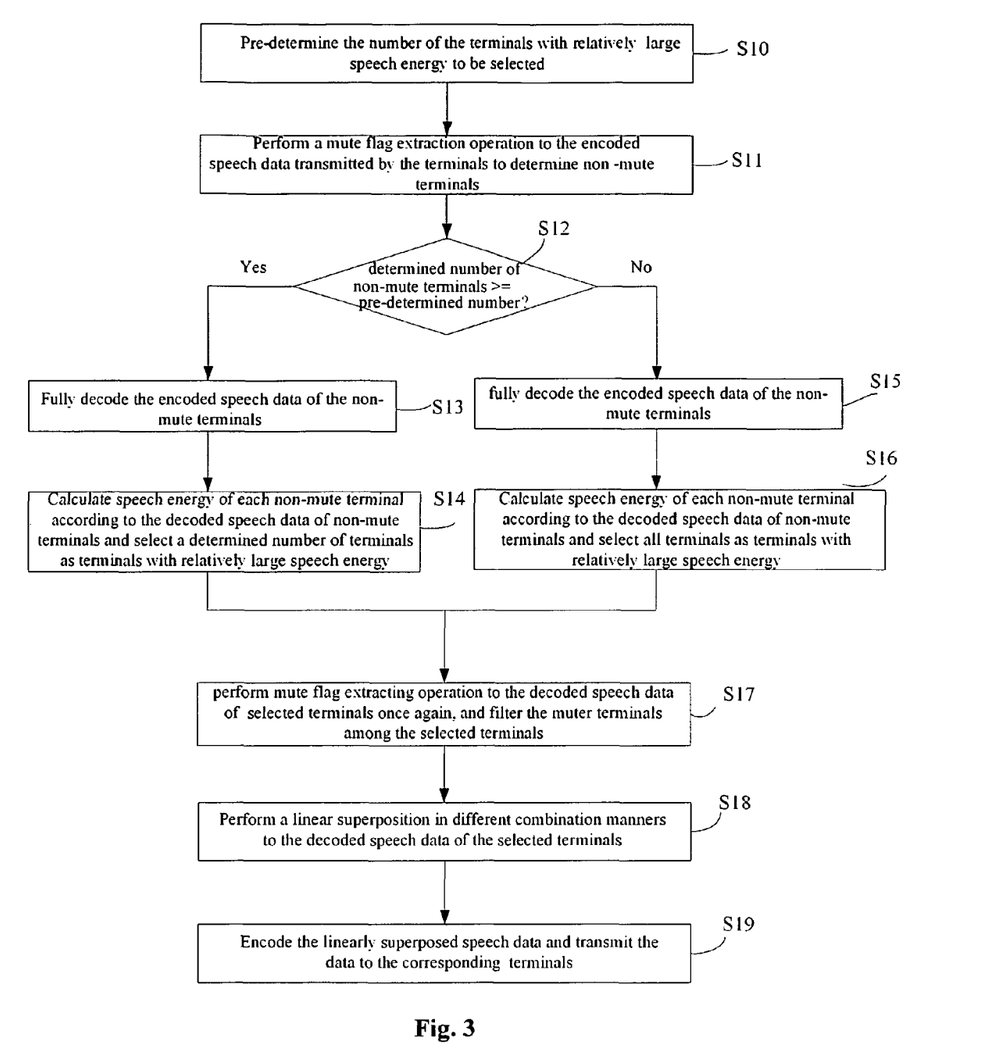
FIG. 3. is a flow chart illustrating a speech-switching process in which a method of fully decoding is adopted to calculate the speech energy of terminals according to an embodiment of the present invention.

Refer to FIG. 3, which is a flow chart illustrating a speech-switching process in which a fully decoding method is adopted to calculate the speech energy of terminals according to an embodiment of the present invention. The process for speech-switching shown in the figure mainly includes the following steps:

Step S10, in a conference system attended by multiple terminals, the number of the terminals with relatively large speech energy to be selected each time is determined first; in general, it is recommended to select two or three terminals with relatively large speech energy at a time, which can ensure better speech communication quality between the terminals during the process of speech switching.

Step S11, a mute flag is extracted from the encoded speech data transmitted from each terminal attending the conference, to determine all the non-mute terminals among the terminals attending the conference at any time.

In the majority of speech encoding/decoding protocols, such as the speech encoding/decoding protocols G.723.1 and G.729, mute detection has been implemented when the speech data is encoded, mute flags can be extracted directly from the encoded speech data. The speech encoding/decoding protocol G.711 can also support extracting mute flags from the encoded speech data directly according to the setting of device vendors. While for the speech encoding/decoding protocols in which mute flags cannot be extracted from the encoded speech data, the mute flags can be extracted from the decoded speech data after fully decoding or non-fully decoding is performed to the encoded speech data of the terminals, in order to determine the non-mute terminals at any time.

Step S12, determining whether the number of the non-mute terminals obtained in step S11 is relatively large than or equal to the number of the terminals with relatively large speech energy to be selected pre-defined in step S10; and if relatively large or equal, go to step S13; otherwise, go to step S15;

Step S13, the encoded speech data of each non-mute terminal, which is determined in step S11, is fully decoded;

Step S14, the speech energy of each non-mute terminal is calculated according to the fully decoded speech data of each non-mute terminal obtained in step S13, and the speech energy values of the non-mute terminals are compared with each other to select a predefined number of terminals with relatively large speech energy, then step S17 will be executed;

Step S15, the encoded speech data of each non-mute terminal obtained in step S11 is fully decoded;

Step S16, the speech energy of each non-mute terminal is calculated according to the fully decoded speech data of each non-mute terminal obtained in step S15, and all of the non-mute terminals are selected as terminals with relatively large speech energy, then step S17 will be executed;

Step S17, the mute flag extracting operation is performed to the fully decoded speech data of each selected terminal in step S14 or step S16 once again, in order to further filter out the mute terminals from the selected terminals to ensure each remaining selected terminal to be a non-mute terminal, thereby the noise introduced by mute terminals can be avoided and the effect of speech communication can be improved;

Step S18, the fully decoded speech data of the remaining selected terminals is linearly superposed in various combination;

Step S19, the linearly superposed speech data of various combinations obtained in step S18 is encoded respectively, and then transmitted to the corresponding terminals.

Wherein, the operation that the speech data of the selected terminals is mixed and switched, then encoded and transmitted to different terminals in step S18 and step S19 is implemented as the following:

For the selected terminals, the decoded speech data of one selected terminal is isolated in turn, and the decoded speech data of the other selected terminals is linearly superposed, then the superposed speech data is encoded and transmitted to the isolated terminal; the linear superposition will be performed to the decoded speech data of each selected terminal in the above-mentioned manner, and then the superposed speech data is encoded according to the corresponding protocols and transmitted to corresponding terminals.

While for each unselected terminal, a uniform linear superposition will be performed to the decoded speech data of all the selected terminals, the superposed speech data is then encoded with various protocols, and transmitted to the corresponding unselected terminals. Wherein, among the unselected terminals, for the terminals adopting the same speech encoding/decoding protocol, the superposed speech data is encoded according to the corresponding uniform protocol and transmitted to the unselected terminals adopting the same speech encoding/decoding protocol by means of multicasting or broadcasting. As a result, both the times of speech encoding and the occupation of system resources can be reduced.

On receiving the corresponding encoded speech data, each terminal will perform a decoding operation with the corresponding protocol and demodulate the data to speech signals. Then each terminal can hear the voice information of the other terminals, thus implementing the speech switching of multi-point communication.

The operation for selecting the terminals with relatively large speech energy in the above-mentioned step S14 and step S16 will be illustrated below:

Suppose there are M terminals that attend a same conference, and the number of the terminals with relatively large speech energy is predefined as 3, then at time t, according to the results of mute flag extraction of all the terminals:

If only one terminal has voice, this terminal is selected as the terminal with relatively large speech energy to take part in the speech-mixing and switching process;

If two terminals have voice, the two terminals will be selected as the terminals with relatively large speech energy to take part in the speech-mixing and switching process;

If the number of terminals that have voice is more than or equal to 3, 3 terminals with relatively large speech energy will be selected to take part in the speech-mixing and switching process according to the speech energy comparison results of these terminals.

The procedure of speech-mixing and switching between the terminals in step S18 and step S19 will be illustrated with reference to an example:

Similarly, suppose that there are M terminals attending a same conference, and the number of the terminals with relatively large speech energy to be selected is predefined as 3, then at time t, If only one terminal takes part in the speech-mixing and switching, for example, a terminal A has voice and takes part in the speech-mixing and switching, the terminal A will receive the mute data; while the other terminals receive the encoded speech data of the terminal A.

If only two terminals have voice, the speech data of these two terminals will take part in speech mixing, for example, in the case that terminal A and terminal B have voice, speech-mixing and switching will be performed to the speech data of terminal A and terminal B. The terminal A receives the encoded speech data of the terminal B, and the terminal B receives the encoded speech data of the terminal A, while the other terminals receive the linearly superposed encoded speech data of the terminal A and the terminal B, i.e. the other terminals can hear the voice of the terminal A and the terminal B at the same time.

If there are 3 or more than 3 terminals that have voice, for example, the terminal A, terminal B and terminal C have voice at the same time, speech-mixing and switching will be performed to the decoded speech data of the terminal A, the terminal B and the terminal C. The terminal A receives the linearly superposed encoded speech data of the terminal B and the terminal C, i.e. the terminal A can hear the voice of the terminals B and C; the terminal B receives the linearly superposed encoded speech data of the terminals A and C, i.e. the terminal B can hear the voice of the terminal A and the terminal C; the terminal C receives the linearly superposed encoded speech data of the terminal A and the terminal B, i.e. the terminal C can hear the voice of the terminal A and the terminal B; the other terminals receive the linearly superposed encoded speech data of the terminals A, B and C, i.e. the other terminals can hear the voice of the terminals A, B and C.

When the linearly superposed decoded speech data after speech mixing and switching is received by each terminal in the above mentioned manner, the data is sent to each corresponding terminal.

The terminals that do not take part in the speech-mixing and switching, i.e. the mute terminals or the terminals only responsible for receiving voice at time t, need only to perform a corresponding times of encoding according to the number of various speech encoding/decoding protocols adopted by these terminals, since the linearly superposed speech data received by these terminals are the same. That is, for the terminals adopting a same speech encoding/decoding protocol, the encoding needs to be performed, by using the speech encoding/decoding protocol adopted by the terminals, only once to the linearly superposed speech data received by these terminals, and then the encoded speech data will be transmitted to these terminals by multicasting or broadcasting.

For example:

If there are five terminals that do not take part in the speech mixing and switching at time t, wherein, three of them adopt the speech encoding/decoding protocol G.732.1, and the other two of them adopt the speech encoding/decoding protocol G.729, the encoding operation of G.732.1 protocol is performed only once to the linearly superposed speech data, and the encoded speech data will be transmitted, by multicasting or broadcasting, to the three terminals adopting G.732.1 protocol; and the encoding operation of G.729 protocol is performed only once to the linearly superposed speech data, and the encoded speech data will be transmitted, by multicasting or broadcasting, to the two terminals adopting G.729 protocol.

On receiving the corresponding encoded speech data, each of the above-mentioned terminals may decode the data with the corresponding protocol to obtain the normal voice signals.

Wherein, when the encoded speech data of each terminal is fully decoded to calculate the speech energy of each terminal, this fully decoding method may include the following process:

The decoder looks up an excitation codebook table to extract the corresponding code vectors from the excitation codebooks according to the 10-bit codebook index contained in the encoded speech data transmitted by the terminals;

A logarithmic gain prediction and a decoding synthesis filtering are performed to the extracted code vectors to obtain the corresponding decoded vectors; and all the coefficients in the logarithmic gain predictor and the decoding synthesis filter are updated accordingly; in general, for the fully decoding operation, the order of logarithmic gain prediction is set to about 10 and the order of decoding synthesis filtering is set to about 50.

Then, a postfiltering process is performed to the decoded vectors to obtain the corresponding fully decoded speech data, here the postfiltering process can improve the acoustical effect of the speech data; the coefficients in the postfilter are updated based on the decoded speech data; then the speech energy values of the corresponding terminals are calculated according to the 5 sampled values contained in the decoded speech data which has been postfiltered.

Wherein, in step S14 and step S16, according to the decoded speech data of each terminal, the speech energy of each terminal can be calculated in the following manner:

$$E(t) = \sum_{n=t_1}^{t_2} S^2(n)$$

Where E(t) represents the speech energy value of a non-mute terminal at time t, and S(n) represents the encoded speech data of a non-mute terminal at each n; $t_1$ and $t_2$ represent the starting time and ending time for calculating the speech energy of the non-mute terminals respectively.

The speech energy of each terminal can also be calculated according to the decoded speech data of each terminal in the following manner:

$$E(t) = \sum_{n=t_1}^{t_2} |S(n)|$$

Where E(t) represents the speech energy value of a non-mute terminal at time t, and S(n) represents the encoded speech data of a non-mute terminal at each n; $t_1$ and $t_2$ represent the starting time and ending time for calculating the speech energy of the non-mute terminal respectively.

In the above mentioned step S18, different linear superposition for decoded speech data can be performed according to the decoded speech data between different non-mute terminals in the following manner:

$$S = \lambda_1 \times S_1 + \lambda_2 \times S_2 + \ldots + \lambda_n \times S_n$$

Where $\lambda_1, \lambda_2 \ldots \lambda_n$ are weighting factors, and $\lambda_1 + \lambda_2 + \ldots \lambda_n = 1$; S is the linearly superposed decoded speech data which is to be received by the terminals, $S_1$ is the decoded speech data of the first terminal, $S_2$ is the decoded speech data of the second terminal, . . . and $S_n$ is the decoded speech data of the nth terminal.

Figure 4:
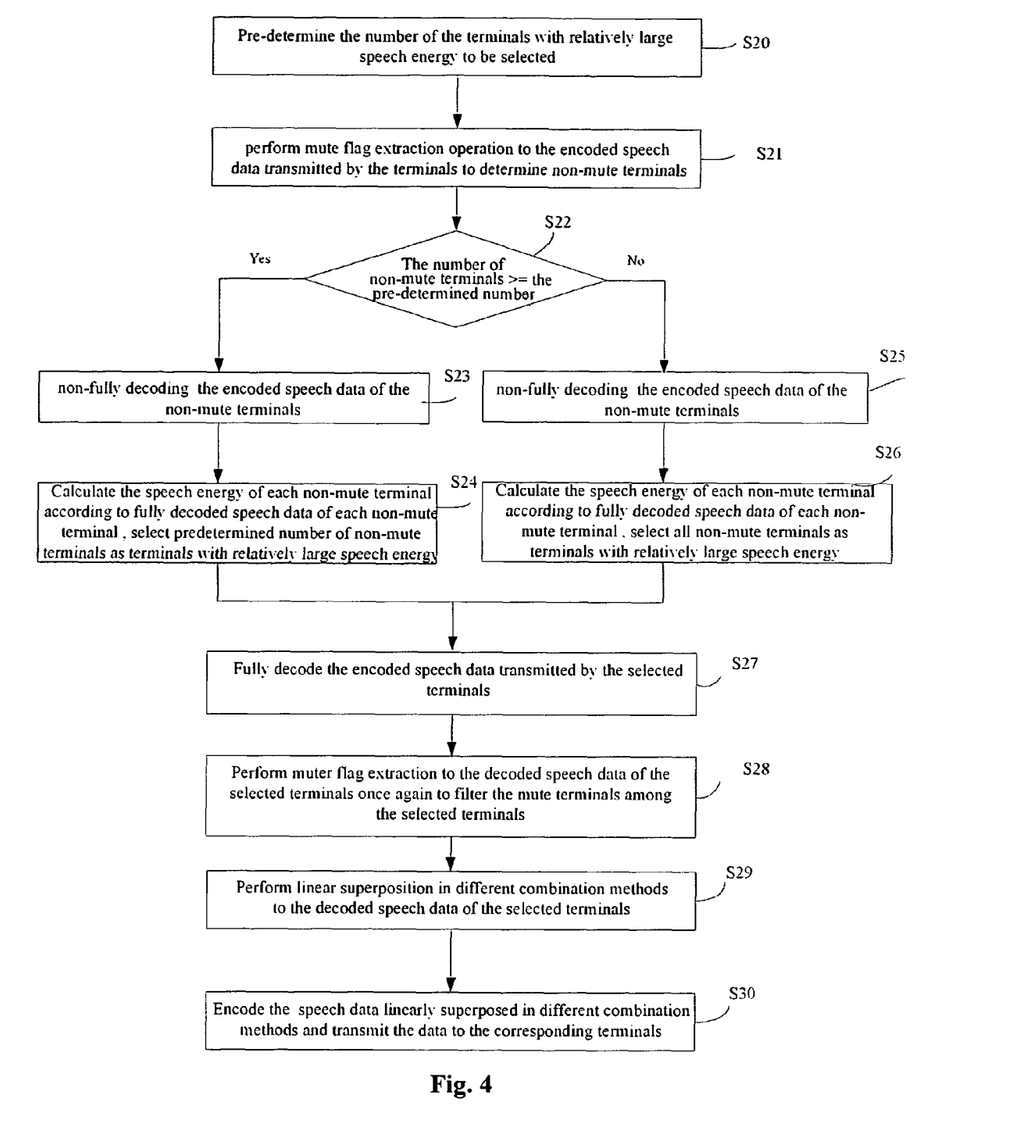
FIG. 4. is a flow chart illustrating a speech-switching process in which a method of non-fully decoding is adopted to calculate the speech energy of terminals according to an embodiment of the present invention.

Now refer to FIG. 4, which shows a flow chart illustrating the speech switching procedure in which the non-fully decoding method is adopted to calculate the speech energy of the terminals according to a speech switching method of the present invention. The procedure of speech switching shown in this figure is similar to that shown in FIG. 3, the different steps will be described in detail hereinafter, while the same steps, which may refer to the description of FIG. 3, will not be described herein unnecessarily:

The procedure of step S20 to step S22 may refer to the step S10 to step S12 shown in FIG. 3;

Step S23, the encoded speech data of each non-mute terminal obtained in step S21 is non-fully decoded;

Step S24, the speech energy of each non-mute terminal is calculated according to the non-fully decoded speech data of each non-mute terminal obtained in step S23, and the speech energy values of the non-mute terminals are compared with each other to select a determined number of terminals with relatively large speech energy, and then step S27 will be executed;

Step S25, the encoded speech data of each non-mute terminal obtained in step S21 is non-fully decoded;

Step S26, the speech energy of each non-mute terminal is calculated according to the non-fully decoded speech data of each non-mute terminal obtained in step S25, and all the non-mute terminals are selected as terminals with relatively large speech energy, and then step S27 will be executed;

Here, the use of a non-fully decoding method during the calculation of the speech energy value of each terminal is determined according to the speech encoding/decoding protocol selected by the terminal:

If a terminal adopts the speech encoding/decoding protocol G.728, a non-fully decoding method can be used, and its speech energy will be calculated according to the non-fully decoded speech data;

In the case that a terminal adopts speech encoding/decoding protocol G.723.1 or G.729, less system resources are occupied during the encoding/decoding of its own speech data, thus either a non-fully decoding method or a fully decoding method can be used to calculate the speech energy.

Step S27, the encoded speech data transmitted from the terminals which have relatively large speech energy and are selected in step S24 or step S26, are fully decoded, then step S28 will be executed;

The procedure of step S28 to step S30 can refer to step S17 to step S19 shown in FIG. 3, thus the whole speech switching process between multiple terminals in the case that the calculation of speech energy of the terminals is based on a non-fully decoding method is completed.

Wherein, when the encoded speech data of each terminal is non-fully decoded to calculate the speech energy of each terminal based on the non-fully decoded speech data, the non-fully decoding method mainly includes the following procedure:

The decoder looks up the excitation codebook table, according to the 10-bit codebook index contained in the encoded speech data transmitted by a terminal, to extract the corresponding code vector from the excitation codebooks;

A logarithmic gain prediction and a decoding synthesis filtering are performed to the extracted code vectors to obtain the corresponding non-fully decoded vectors; all the coefficients in the logarithmic gain predictor and decoding synthesis filter are accordingly updated. During the non-fully decoding operation in the speech switching method according to the embodiment of the present invention, the order of the logarithmic gain prediction is generally set to about 4 and the order of the decoding synthesis filtering is generally set to about 8. Then the speech energy values of the corresponding terminals may be calculated based on the 5 sampled values contained in the decoded speech data that has been postfiltered; thus the whole procedure of non-fully decoding to the encoded speech data of the terminals is completed.

In fact, the above-mentioned non-fully decoding procedure is a cut-down of the fully decoding process. The non-fully decoding procedure will reduce the occupation of system resources for the following reasons:

1) the orders of the logarithmic gain prediction and the decoding synthesis filtering are reduced, the orders are reduced to 4 and 8 from the original 10 and 50 respectively; the reason of the reduction is as follows:

(a) It can be seen from the analysis of the characteristics of speech signals that, the energy of a speech signal mainly centralizes at the first 3-4 formants, and one formant corresponds to a pair of poles. During the calculation of the speech energy, only a coarse envelope match of speech signals, instead of the accurate recovery of speech data, is needed, thus the above mentioned object can be achieved with a logarithmic gain prediction of only 6-8 orders;

(b) The orders of the logarithmic gain prediction and the decoding synthesis filtering are reduced to 4 and 8 from the original 10 and 50 respectively, in which the operations of addition and multiplication are reduced greatly, and the amount of calculation is decreased significantly; and the orders of the corresponding iterative operations of the logarithmic gain adaptation and decoding synthesis adaptation will be reduced accordingly, thereby the amount of calculation is decreased significantly once again.

2) The postfiltering process during the fully decoding process is removed. With the postfiltering process, the voice quality of decoded speech data can be enhanced during the decoding process. However the object herein is to calculate the speech energy, which does not demand very good voice quality since only the variation of the energy is needed to be reflected. Also, the postfiltering process is relatively independent, as a result, the removing of this process will not affect the other portions for decoding.

It can be seen from the above that, for a majority of speech encoding/decoding protocols that support the non-fully decoding method during calculation of speech energy of the terminals, the non-fully decoding method, compared with the fully decoding method, occupies less system resources while calculating speech energy.

Wherein, in the case that a terminal adopts the speech encoding/decoding protocol G.711, since this protocol implements the encoding with the A-law or µ-law, the encoded speech data can be regarded as representing the waveform of the voice, and the speech energy can be directly calculated by performing a weighted square or a weighting to the absolute value of the encoded speech data.

Hereinafter, compared with the speech switching process in the prior art, the advantages of the method for speech switching according to the embodiment of the present invention will be illustrated:

For example:

Suppose that there are M terminals attending a same conference at the same time, and it is predefined that N terminals with lager speech energy will be selected to take part in the speech-mixing and switching; and suppose that all the terminals adopt the same speech encoding/decoding protocol, for example, the speech encoding/decoding protocol G.728.

Since the speech encoding/decoding protocol G.728 supports the non-fully decoding method in calculation of speech energy value of a terminal, the non-fully decoding method will be adopted in this example to calculate speech energy. Suppose there are N terminals having voices at time t, i.e. there are N non-mute terminals.

In the prior art: a fully decoding operation needs to be performed to each terminal, i.e. M times of fully decoding are needed to calculate the speech energy of M terminals respectively.

M times of encoding operation after speech-mixing and switching is needed, before the data is transmitted to the individual terminals.

Whereas, in the present invention: a non-fully decoding operation needs to be performed to the encoded speech data of each non-mute terminal respectively, i.e. N times of non-fully decoding operation are needed to calculate the speech energy of all the non-mute terminals.

Or, a fully decoding operation is needed to be performed to the encoded speech data of each non-mute terminal respectively to obtain the mixed fully decoded data of each non-mute terminal, i.e. N times of fully decoding operation are needed.

Since all the terminals adopt the same speech encoding/decoding protocol, the encoding protocol of the encoded speech data received by each of the terminals that do not take part in the speech-mixing and switching, i.e. the mute terminals and the terminals that are only responsible for receiving speech signals, is the same. For these terminals, only one encoding operation is needed, while for the terminals that take part in the speech-mixing and switching, the encoding operation needs to be implemented respectively, i.e. N times of encoding operations are needed. Therefore, (N+1) times of encoding operations are needed. Generally, M>>N, so the system resources occupied in the speech-switching method according to the embodiment of the present invention will be reduced greatly. All of the terminals taking part in the speech-mixing and switching are non-mute terminals, the mute terminals will not take part in the process of speech switching, so that noise will not be introduced and the effect of speech communication can be improved.

Hereinafter, the advantages of the speech switching method according to an embodiment of the present invention, in which a mute flag extraction operation is adopted so that only the speech energy of non-mute terminals is calculated, will be described compared with the method of the prior art.

In a telephone conference system, suppose that it is predefined that N terminals with lager speech energy are to be selected to take part in speech-mixing and switching. In the prior art, N terminals with relatively large speech energy are fixedly selected to take part in the speech-mixing and switching, thus noise is certain to be introduced. Moreover, there is a conflict between the noise and the number of the terminals taking part in the speech-mixing and switching, That is, the fewer the terminals taking part in the speech-mixing and switching, the less the probability of introducing the noise. However the frequent switching between the terminals taking part in the speech-mixing and switching will influence the normal speech exchange. If the number of the terminals taking part in the speech-mixing and switching is large, the times of speech-mixing and switching will be reduced, but the probability of introducing the noise will be increased accordingly.

While in the speech-switching method according to the embodiment of the present invention, it is predefined that at most N terminals with lager speech energy is to be selected to take part in speech-mixing and switching:

If mute flags can be extracted from the encoded speech data of the terminals, mute states of the terminals will be taken into consideration in the selection of the number of the terminals taking part in speech-mixing and switching, and at most N terminals, which have voice and relatively large speech energy, will be selected to take part in speech-mixing and switching. If there are only K (K<N) terminals having voice, these K terminals will be selected to take part in the real-time speech-mixing and switching.

If mute flags cannot be extracted directly from the encoded speech data of the terminals, N terminals may be selected as terminals with relatively large speech energy first and a decoding process will be performed to the terminals with relatively large speech energy. Then, a mute flag detection will be performed to the decoded speech data, in order to determine whether these terminals can take part in the speech-mixing and switching, so that the mute terminals will not take part in the speech-mixing and switching and the unnecessary noise will not be introduced.

Wherein, in the existing speech encoding/decoding protocols:

The speech encoding/decoding protocols G.723.1A and G.729A+B can support the direct extraction of mute flags from the encoded speech data;

The speech encoding/decoding protocol G.728 cannot support the direct extraction of mute flags from the encoded speech data. The data need to be decoded first before extracting the mute flags from the encoded speech data;

For the speech encoding/decoding protocol G.711, it depends on the configuration of the device vendors whether the speech encoding/decoding protocol G.711 supports the direct extraction of mute flags from the encoded speech data or not.

For example:

Suppose that there are M terminals attending a same conference, N terminals with relatively large speech energy will be selected to take part in speech-mixing and switching. However, at time t, there are only K terminal having voice, and all the other terminals are in the state of mute. Suppose that all the terminals adopt the speech encoding/decoding protocol G.723.1.

When K<N:

In the prior art: although there are only K terminal having voices, N terminals are still selected to take part in speech-mixing and switching. The terminals, which are not selected to take part in the speech-mixing and switching, are very likely to hear the superposition of the voice signals from the K terminals having voice and the noise signals introduced by the other (N-K) mute terminals; while the terminals, which are selected to take part in speech-mixing and switching, will receive the noise signals introduced by the other terminals which have no voice and are still selected to take part in speech-mixing and switching.

In the present invention: only the k terminals having voice are selected to take part in speech-mixing and switching, so that the terminals which are not selected to take part in the speech-mixing and switching, are very likely to hear only the superposition of the voice signals from the K terminals having voice; while the terminals selected to take part in speech-mixing and switching, will also receive only the superposition of the voice signals from the other terminals which have voice and are selected to take part in speech-mixing and switching. As a result, noise will not be introduced since the mute terminals do not take part in the speech-mixing and switching, thus, the effect of speech communication can be improved.

Figure 5:
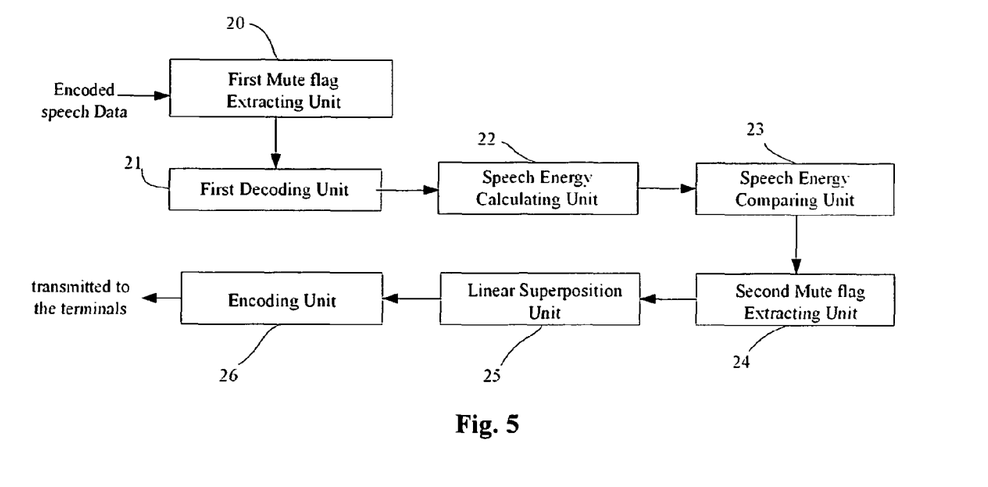
FIG. 5. is a block diagram illustrating the structure of a speech-switching device according to the first embodiment of the present invention.

Corresponding to the above-mentioned method for speech switching, the present invention also provides an apparatus for speech switching. Refer to FIG. 5, which shows a block diagram illustrating the structure of the speech switching apparatus according to the first embodiment of the present invention. This apparatus for speech switching may include: a first mute flag extracting unit 20, a first decoding unit 21, a speech energy calculating unit 22, a speech energy comparing unit 23, a second mute flag extracting unit 24, a linear superposition unit 25 and an encoding unit 26, wherein the relationship and functions of all these units are as following:

The first mute flag extracting unit 20 is adapted to extract the mute flags from the encoded speech data transmitted by each terminal respectively;

The first decoding unit 21 is connected with the first mute flag extracting unit 20, and is adapted to decode the encoded speech data of a non-mute terminal after the mute flags are extracted;

The speech energy calculating unit 22 is connected with the first decoding unit 21, and is adapted to calculate the speech energy of each non-mute terminal according to the decoded speech data of each non-mute terminal from the first decoding unit 21;

The speech energy comparing unit 23 is connected with the speech energy calculating unit 22, and is adapted to compare the speech energy values of the non-mute terminals and to select the terminals with relatively large speech energy according to the speech energy value of each terminal calculated by the speech energy calculating unit 22;

The second mute flag extracting unit 24 is connected with the speech energy comparing unit 23, and is adapted to perform a second time of mute flag extraction operation to the decoded speech data of each terminal selected by the speech energy comparing unit 23 and to filter out the mute terminals from the selected terminals;

The linear superposition unit 25 is connected with the second mute flag extracting unit 24, and is adapted to perform a linear superposition process in different combination manners to the decoded speech data of the selected terminals processed by the second mute flag extracting unit 24;

And the encoding unit 26 is connected with the linear superposition unit 25, and is adapted to encode the decoded speech data processed by the linear superposition unit 25 and to transmit the data to the corresponding terminals.

In general, the block diagram of the speech-switching apparatus of the first embodiment described above is applicable when the speech energy of a terminal is calculated with the fully decoding method.

Figure 6:
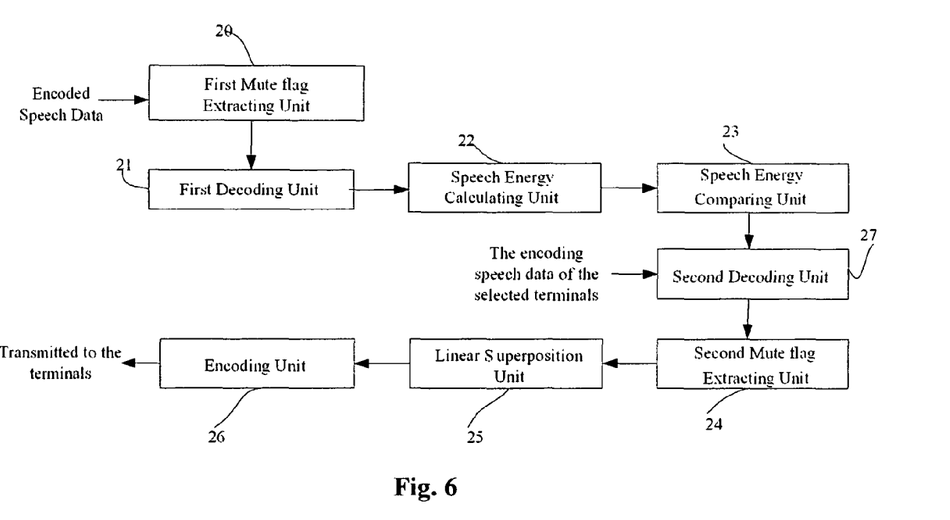
FIG. 6. is a block diagram illustrating the structure of a speech-switching device according to the second embodiment of the present invention.

Now refer to FIG. 6, which is a block diagram illustrating the structure of the speech-switching apparatus according to the second embodiment of the present invention. This block diagram is applicable in the case that the speech energy of a terminal is calculated with the non-fully decoding method. Therefore, a second decoding unit 27 is needed to be connected between the speech energy comparing unit 23 and the second mute flag extracting unit 24 on the basis of the structure of the first embodiment. The second decoding unit 27 fully decodes the encoded speech data transmitted from each selected terminal according to the information of the terminals selected by speech energy comparing unit 23, so that the following linear superposition of the decoded speech data may be implemented. The operation principles of the other units are as same as those of the corresponding units of the first embodiment, and will not be repeated herein unnecessarily.

Figure 7:
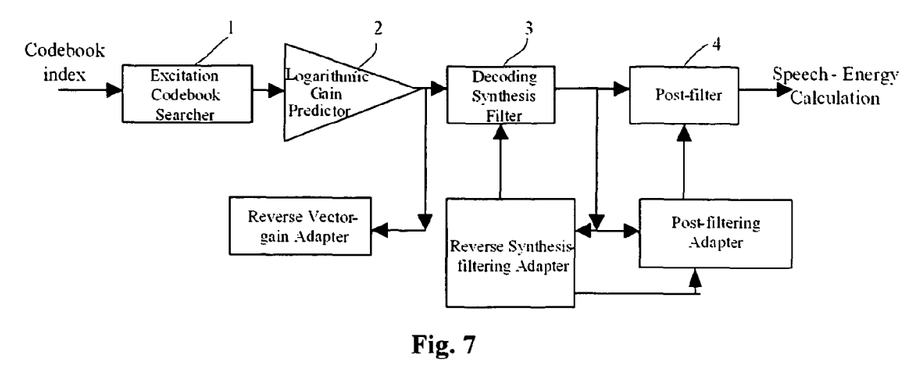
FIG. 7. is a block diagram illustrating the structure of a first decoding unit when the speech-switching device supports the fully decoding method according an embodiment of the present invention.

In the case that the speech-switching apparatus according to the embodiment of the present invention supports the fully decoding method when calculating the speech energy of each terminal, the first decoding unit 21 in the speech-switching apparatus is a fully decoding device. Now Refer to FIG. 7, which shows a block diagram illustrating the structure of the first decoding unit when the speech switching apparatus support the fully decoding method to calculate speech energy according to an embodiment of the present invention. Here the speech encoding/decoding protocol adopted by the terminals is G.728, and the first decoding unit 21 includes: an excitation codebook searcher 1, a logarithmic gain predictor 2, a decoding synthesis filter 3 and a postfilter 4, wherein the operation principles of the components are as following:

The excitation codebook searcher 1 is adapted to look up the corresponding excitation codebook according to the 10-bit codebook index contained in the encoded speech data transmitted from a terminal, in order to extract the corresponding code vector from the excitation codebook;

The logarithmic gain predictor 2 is adapted to perform a logarithmic gain prediction to the code vector extracted by the excitation codebook searcher 1; here the order of the logarithmic gain predictor 2 is set to 10;

The decoding synthesis filter 3 is adapted to perform a decoding synthesis filtering process to the code vector, which has been processed by the logarithmic gain predictor 2, in order to obtain the corresponding decoded vectors; here the order of the decoding synthesis filter 3 is set to 50;

The postfilter is adapted to perform a postfiltering process to the decoded vector sent from the decoding synthesis filter 3, in order to obtain the corresponding fully decoded speech data.

Figure 8:
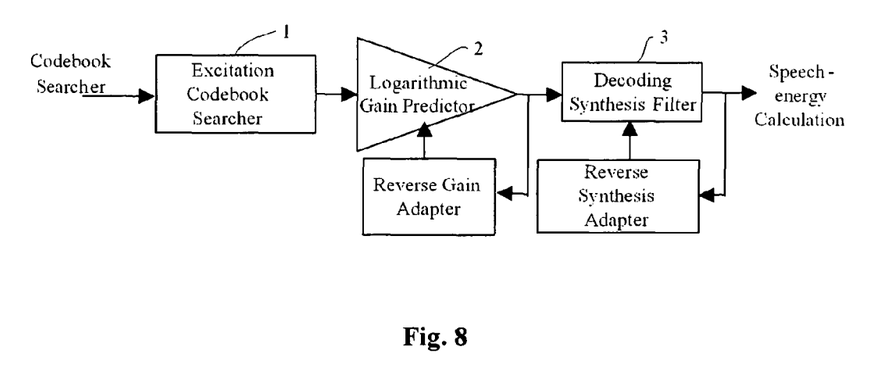
FIG. 8. is a block diagram illustrating the structure of a first decoding unit when the speech-switching device supports the non-fully decoding method according an embodiment of the present invention.

When the speech switching apparatus according to an embodiment of the present invention supports the non-fully decoding method in calculation of the speech energy of each terminal, the first decoding unit 21 in the speech switching apparatus is a non-fully decoding device. Refer to FIG. 8, which shows a block diagram illustrating the structure of the first decoding unit when the speech switching apparatus supports the non-fully decoding method in calculation of the speech energy; here the speech encoding/decoding protocol adopted by the terminals is G.728, and the first decoding unit 21 includes: an excitation codebook searcher 1, a logarithmic gain predictor 2 and a decoding synthesis filter 3, wherein the operation principles of these components are:

The excitation codebook searcher 1 is adapted to look up the corresponding excitation codebook according to the 10-bit codebook index contained in the encoded speech data transmitted by a terminal, in order to extract the corresponding code vector from the excitation codebook;

The logarithmic gain predictor 2 is adapted to perform a logarithmic gain prediction to the code vector extracted by the excitation codebook searcher 1; here the order of the logarithmic gain predictor 2 is set to 4;

The decoding synthesis filter 3 is adapted to perform a decoding synthesis filtering process to the code vector, which has been processed by the logarithmic gain predictor 2, in order to obtain the corresponding decoded vector; here the order of the decoding synthesis filter 3 is set to 8;

Here, compared with the first decoding unit 21 supporting the fully decoding operation, the orders of the logarithmic gain predictor 2 and the decoding synthesis filter 3 in this first decoding unit 21 supporting non-fully decoding operation are reduced (the orders are reduced to 4 and 8 from the original 10 and 50 respectively). The reason for removing the postfilter 4 has been detailed in the above described speech switching method according to the present invention, and will not be repeated herein.

Figure 9:
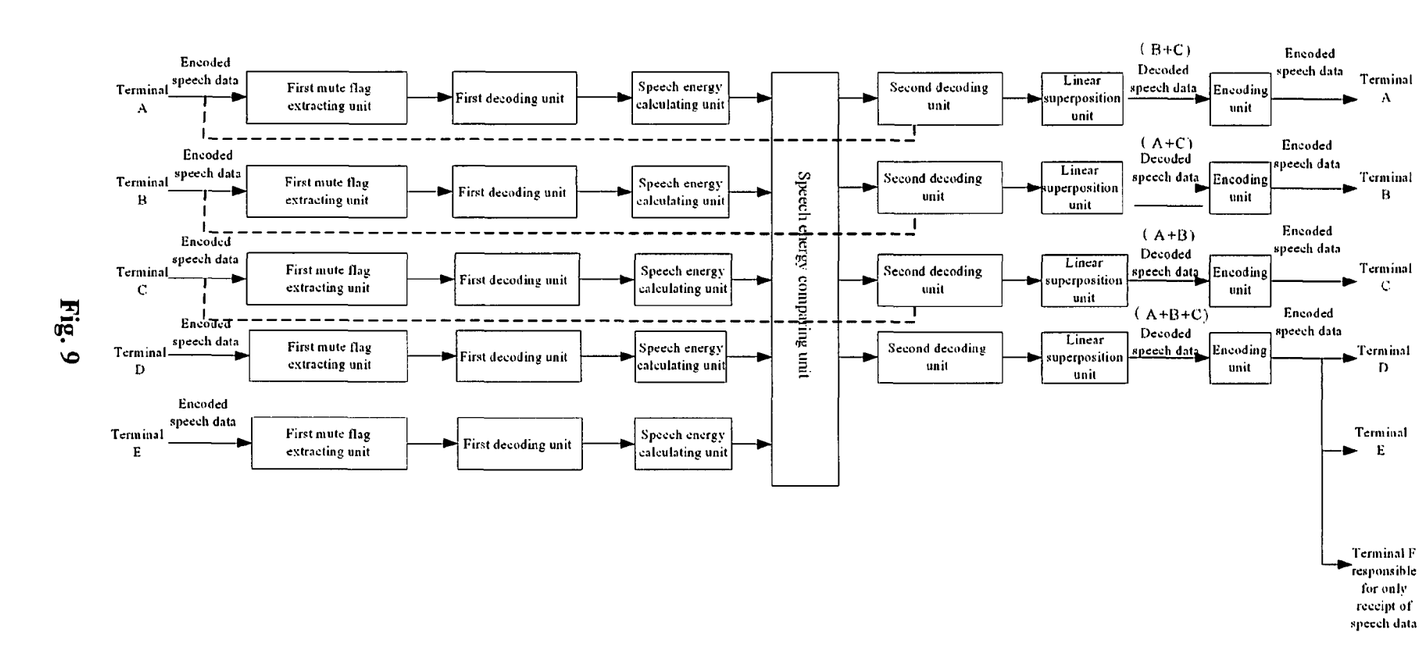
FIG. 9. is a schematic diagram illustrating the procedure of a method for speech switching and its device according to an embodiment of the present invention.

Now refer to FIG. 9, which is a schematic diagram illustrating the implementation procedure of an embodiment of the method and the apparatus for speech switching according to an embodiment of the present invention. In FIG. 9, the case that 6 terminals attend a same conference is shown, wherein, the terminal A, terminal B, terminal C, terminal D and terminal E are terminals which receive/transmit speech data normally, while the terminal F is a terminal which is responsible for only the reception of speech data:

Suppose that the terminal A, terminal B and terminal C have relatively large speech energy at time T;

In the conference, it is specified that at most three terminals, which have voice and relatively large speech energy, will be selected to take part in speech-mixing and switching;

And the speech encoding/decoding protocol adopted by each terminal supports the calculation of speech energy according to the non-fully decoded speech data;

The particular speech-switching procedure is shown in this FIG. 9 and will not be detailed herein. Here, for the case that the terminal A, terminal B and terminal C take part in the speech-mixing and switching simultaneously, after the linear superposition is performed to the decoded speech data of each terminal by the linear superposition unit, the following steps will be executed respectively:

the linearly superposed speech data of the terminal B and terminal C is encoded and transmitted to the terminal A;

the linearly superposed speech data of the terminal A and terminal C is encoded and transmitted to the terminal B;

the linearly superposed speech data of the terminal A and terminal B is encoded and transmitted to the terminal C;

the linearly superposed speech data of the terminal A, terminal B and terminal C is encoded and transmitted to the terminal D, terminal E and terminal F.

To sum up, in the case that a speech switching between multiple terminals is processed with the method and apparatus for speech switching according to the embodiments of the present invention, the times for encoding and decoding the speech data will be greatly reduced, so that a multi-point communication system can be designed flexibly and conveniently, and the number of terminals accessing to the system and the number of conferences supported by the system can be greatly increased in the case that the same system resources have been provided.

Also, a non-fully decoding approach is adopted by the method and apparatus according to an embodiment of the present invention in calculation of speech energy of a terminal. With this approach, compared with the method which requires a very large amount of calculation for calculating speech energy in the prior art, less amount of calculation is needed to calculate the speech energy, so that the occupation of system resources will be greatly reduced.

In the method and apparatus according to an embodiment of the present invention, the terminals that will take part in speech-mixing and switching are selected according to the mute flags extracted from the encoded speech data, or according to the mute flags extracted from the decoded speech data, so that unnecessary noises will not be introduced into the linearly superposed speech data obtained from the speech-mixing and switching process, thereby the effect of speech communication can be improved and the Signal-to-Noise ratio of voice during the speech-mixing and switching can be increased.

In view of these, the method and apparatus according to the embodiments of the present invention can be widely used in the existing multimedia video-teleconference systems and telephone teleconference systems, which may improve the speech communication quality of these multi-point communication systems and increase the utilization ratio of the system resources.

The above descriptions are merely preferable embodiments of the present invention. It shall be apparent to those skilled in the art that various improvements and modifications can by made without departing from the technical principles of the present invention, and these improvements and modifications shall be covered within the protection scope of the present invention.

What is claimed is:

1. A method, implemented by a speech-switching device connected to a communication network, for speech switching between multiple terminals, comprising steps of:
    (1) extracting, by the speech-switching device, a mute flag from encoded speech data transmitted by each of the terminals respectively, and determining one or more non-mute terminals;
    (2) non-fully decoding, by the speech-switching device, the encoded speech data of each non-mute terminal respectively;
    (3) calculating, by the speech-switching device, a speech energy value of each non-mute terminal according to the non-fully decoded speech data of each non-mute terminal;
    (4) comparing, by the speech-switching device, the speech energy values of the non-mute terminals with each other and selecting one or more terminals with a largest speech energy;
    (5) fully decoding, by the speech-switching device, the encoded speech data transmitted by each remaining selected terminal; and
    (6) performing, by the speech-switching device, a linear superposition of different combination modes to the decoded speech data of the selected terminals, encoding, by the speech-switching device, the decoded speech data obtained after the linear superposition of the different combination modes, and transmitting the encoded data to the corresponding terminals respectively;
    wherein when the terminals adopt speech coding/decoding protocol G.728, the non-fully decoding comprises:
        extracting corresponding code vectors from excitation codebooks according to codebook indexes contained in the encoded speech data transmitted by the terminals;
        performing a logarithmic gain prediction to the extracted code vectors; and
        performing a decoding synthesis filtering process to the code vectors after the logarithmic gain prediction in order to obtain the corresponding non-fully decoded speech data.

2. The method of claim 1, wherein
an order of the logarithmic gain prediction is set to 4; and
an order of the decoding synthesis filtering process is set to 8.

3. The method of claim 1, further comprising:
pre-determining the number of terminals with the largest speech energy to be selected before step (1);
if the number of the non-mute terminals determined based on the mute flags extracted in step (1) is larger than or equal to the pre-determined number, the pre-determined number of terminals with the largest speech energy are selected in step (4); and
if the number of the non-mute terminals determined based on the mute flags extracted in step (1) is smaller than the pre-determined number, all the non-mute terminals are selected as terminals with the largest speech energy in step (4).

4. The method of claim 1, wherein in step (3), by using the non-fully decoded speech data of the non-mute terminals, the speech energy of each non-mute terminal is calculated by the following formula:

$$E(t) = \sum_{n=t_1}^{t_2} S^2(n)$$

in which, E(t) represents the speech energy of a non-mute terminal at time t, and S(n) is encoded speech data of the non-mute terminal at each moment n; $t_1$ and $t_2$ respectively represent a starting time and an ending time for calculating the speech energy of the non-mute terminal.

5. The method of claim 1, wherein in step (3), according to the non-fully decoded speech data of the non-mute terminals, the speech energy of each non-mute terminal is calculated by the following formula:

$$E(t) = \sum_{n=t_1}^{t_2} |S(n)|$$

in which, E(t) represents the speech energy of a non-mute terminal at time t, and S(n) is encoded speech data of the non-mute terminal at each moment n; $t_1$ and $t_2$ respectively represent a starting time and an ending time for calculating the speech energy of the non-mute terminal.

6. The method of claim 1, wherein step (6) further comprises:
   (51) for the selected terminals, isolating the decoded speech data of one selected terminal at a time in order, performing a linear superposition process to the decoded speech data of other selected terminals, encoding the superposed speech data and transmitting the data to the isolated terminal; and
   (52) performing a uniform linear superposition process to the decoded speech data of all the selected terminals, encoding the superposed speech data and transmitting the data to the unselected terminals.

7. The method of claim 6, wherein step (52) further comprises:
   for the terminals adopting a same speech encoding/decoding protocol among the unselected terminals, encoding the superposed speech data according to the protocol and transmitting the data to these unselected terminals adopting the same speech encoding/decoding protocol.

8. The method of claim 6, wherein the linear superposition of the decoded speech data of the selected terminals is implemented by the following formula:

$$S = \lambda_1 \times S_1 + \lambda_2 \times S_2 + \ldots + \lambda_n \times S_n$$

in which, $\lambda_1, \lambda_2 \ldots \lambda_n$ are weighting factors, and $\lambda_1 + \lambda_2 + \ldots \lambda_n = 1$; S is the decoded speech data after linear superposition to be received by the terminals, $S_1$ is the decoded speech data of the first terminal, $S_2$ is the decoded speech data of the second terminal, ... and $S_n$ is the decoded speech data of the nth terminal.

9. The method of claim 1, wherein between step (4) and step (5), the method further comprises a step of extracting mute flag from the decoded speech data of each of the selected terminals respectively and filtering off the mute terminals from the selected terminals.

10. An apparatus for speech switching between multiple terminals, comprising:
   a first mute flag extracting unit, configured to extract a mute flag from encoded speech data transmitted by each terminal respectively, and determine one or more non-mute terminals;
   a first decoding unit, connected with the first mute flag extracting unit, and configured to non-fully decode the encoded speech data of the non-mute terminals after the mute flags are extracted;
   a speech energy calculating unit, connected with the first decoding unit, and configured to calculate the speech energy value of each non-mute terminal according to the decoded speech data of each non-mute terminal;
   a speech energy comparing unit, connected with the speech energy calculating unit, and configured to compare the speech energy values of the non-mute terminals with each other and select one or more terminals with a largest speech energy;
   a second decoding unit configured to fully decode the encoded speech data transmitted by the terminals with the largest speech energy, wherein the speech energy comparing unit is connected with a linear superposition unit through the second decoding unit;
   a linear superposition unit, connected with the speech energy comparing unit, and configured to perform a linear superposition in different combination methods to the decoded speech data of the selected terminals; and
   an encoding unit, connected with the linear superposition unit, and configured to encode the decoded speech data after linear superposition and transmit the data to the corresponding terminals;
   when the terminals adopt speech encoding/decoding protocol G.728, the first decoding unit further comprises:
      an excitation codebook searcher, configured to extract the corresponding code vectors from excitation codebook according to the codebook indexes contained in the encoded speech data transmitted by the terminals;
      a logarithmic gain predictor, configured to perform a logarithmic gain prediction to the extracted code vectors; and
      a decoding synthesis filter, configured to perform a decoding synthesis filtering process to the code vectors after the logarithmic gain prediction in order to obtain the corresponding non-fully decoded speech data.

11. The apparatus of claim 10, wherein an order of the logarithmic gain prediction is set to 4; and an order of the decoding synthesis filtering process is set to 8.

12. The apparatus of claim 10, wherein the apparatus further comprises: a second mute flag extracting unit configured to extract the mute flags from the decoded speech data of each selected terminal and filter off the mute terminals from the selected terminals, wherein the second decoding unit is connected with the linear superposition unit through the second mute flag extracting unit.

* * * * *